(12) United States Patent
Juni

(10) Patent No.: US 8,664,667 B2
(45) Date of Patent: Mar. 4, 2014

(54) OPTICAL WAVEGUIDE DEVICE

(75) Inventor: Noriyuki Juni, Ibaraki (JP)

(73) Assignee: Nitto Denko Corporation, Ibaraki-shi (JP)

(*) Notice: Subject to any disclaimer, the term of this patent is extended or adjusted under 35 U.S.C. 154(b) by 0 days.

(21) Appl. No.: 13/583,445

(22) PCT Filed: Dec. 27, 2010

(86) PCT No.: PCT/JP2010/073509
§ 371 (c)(1),
(2), (4) Date: Sep. 7, 2012

(87) PCT Pub. No.: WO2011/111281
PCT Pub. Date: Sep. 15, 2011

(65) Prior Publication Data
US 2013/0001726 A1    Jan. 3, 2013

(30) Foreign Application Priority Data

Mar. 9, 2010 (JP) ................. 2010-051533

(51) Int. Cl.
*H01L 31/12* (2006.01)
*H01L 31/0232* (2006.01)
(52) U.S. Cl.
USPC ............... 257/82; 257/432; 257/E31.128
(58) Field of Classification Search
CPC ............... H01L 27/14643; H01L 27/14683; H01L 31/167; H01L 31/0203; H01L 25/167; Y02E 10/50; G02B 6/43; G02B 6/2004; G02B 6/4214
USPC ........ 257/80, 82, 431, 432, E31.128; 385/14, 385/15, 24, 31, 39
See application file for complete search history.

(56) References Cited

U.S. PATENT DOCUMENTS

| 6,351,260 | B1 | 2/2002 | Graham et al. |
| 7,826,699 | B2 | 11/2010 | Juni |
| 2002/0036055 | A1* | 3/2002 | Yoshimura et al. ........... 156/234 |
| 2004/0089019 | A1 | 5/2004 | Kawamura et al. |
| 2009/0102815 | A1 | 4/2009 | Juni |

FOREIGN PATENT DOCUMENTS

| JP | 09-021934 A | 1/1997 |
| JP | 2002-028883 A | 1/2002 |
| JP | 2009-103902 A | 5/2009 |

OTHER PUBLICATIONS

Japanese Office Action dated Mar. 27, 2013, issued in corresponding Japanese Patent Application No. 2010-051533, with English translation (4 pages).
International Search Report of PCT/JP2010/073509, mailing date Jan. 25, 2011.
Japanese Written Opinion of PCT/JP2010/073509, mailing date Jan. 25, 2011.

* cited by examiner

*Primary Examiner* — Nikolay Yushin
(74) *Attorney, Agent, or Firm* — Westerman, Hattori, Daniels & Adrain, LLP

(57) ABSTRACT

An optical waveguide device of the present invention comprises: an optical waveguide including a plurality of cores configured to emit outgoing light from distal ends thereof; and a light-receiving element including a plurality of photo diodes configured to receive the outgoing light. Respective pitches L1 between adjacent cores are greater than pitches L2 between adjacent photo diodes. At least one photo diode on which only outgoing light of each core is incident is present with respect to each of the cores.

8 Claims, 6 Drawing Sheets

PRIOR ART

PRIOR ART

PRIOR ART

US 8,664,667 B2

OPTICAL WAVEGUIDE DEVICE

BACKGROUND OF THE INVENTION

1. Field of the Invention

The present invention relates to an optical waveguide device which comprises: an optical waveguide including a plurality of cores; and a light-receiving element including a plurality of photo diodes.

2. Description of the Related Art

Conventionally, an optical waveguide device which comprises: an optical waveguide including a plurality of cores; and a light-receiving element including a plurality of photo diodes is known (For example, U.S. Pat. No. 6,351,260 B1). In this kind of optical waveguide device, generally, one photo diode is arranged to correspond with one core. Light emitted from each core is received by each corresponding photo diode. Intensity of received light is converted into an electrical signal by each photo diode.

The aforementioned optical waveguide device is typically used for an optical touch panel. In an optical touch panel, light of a light source is blocked by a touch input, such as a finger or a pen and the like. The optical waveguide device detects the position where light intensity is reduced to specify coordinates of the finger or the pen and the like.

FIG. 4 (a) is a schematic plan view of a first example of a conventional optical waveguide device 20 and FIG. 4 (b) is a cross-sectional view of the optical waveguide device 20. The conventional optical waveguide device 20 comprises: an optical waveguide 21; and a light-receiving element 22. The optical waveguide 21 includes a plurality of cores 23. Each core 23 emits outgoing light 25 from each distal end 24 thereof. The light-receiving element 22 includes a plurality of aligned photo diodes 26. Each photo diode 26 receives the outgoing light 25 of the cores 23. Generally, respective pitches (central clearance) L6 between adjacent cores 23 are identical to respective pitches (central clearances) L7 between adjacent photo diodes 26. Consequently, the plurality of cores 23 correspond to the plurality of photo diodes 26 one-on one.

In general, the outgoing light 25 of the cores 23 travels while spreading out in a fan-like foam. Therefore, as shown in FIG. 4 (a), when distances L8 between distal ends 24 of the cores 23 and the light-receiving surfaces of the photo diodes 26 are long, the outgoing light 25 emitted from the cores 23 is not only incident on the photo diodes 26 facing the cores 23 but also on adjacent photo diodes 26.

FIG. 4 (a) illustrates this situation in detail. In FIG. 4 (a), the core 23 of No. 3 has no outgoing light. However, a portion of outgoing light 25 emitted from the core 23 of No. 2 and a portion of outgoing light 25 emitted from the core 23 of No. 4 are incident on the photo diode 26 of No. 3. The photo diode 26 of No. 3 has, however, weak incident light. Therefore, there are fears that the core 23 of No. 3 may be misjudged as having outgoing light regardless of no outgoing light of the core 23 of No. 3.

To avoid such a misjudgment, the threshold of each photo diode 26 needs to be increased so as not to detect incident light from the adjacent cores 23. When the threshold of the photo diode 26 is increased, light-receiving sensitivity of the optical waveguide device 20 is, however, deteriorated in an optical touch panel employing the optical waveguide device 20. This could cause defects that a touch input is not detected in the optical touch panel.

In a second example of a conventional optical waveguide device 30 as a countermeasure of the aforementioned problem, as shown in FIGS. 5(a) and 5(b), cores 31 and photo diodes 32 are caused to approach to shorten distances L9 between distal ends 33 of the cores 31 and light-receiving surfaces of the photo diodes 32. This makes it possible to prevent the light-receiving sensitivity of the optical waveguide device 30 from being deteriorated and to avoid defects of the touch input. This countermeasure, however, causes another problem.

As shown in FIG. 5 (b), in an optical waveguide 34, a core 31 is formed on an under-cladding layer 35 and is further embedded in an over-cladding layer 36. When a distance L9 between the distal end 33 of the core 31 and the light-receiving surface of the photo diode 32 is shortened, as shown in FIG. 5 (c), there is a possibility of the distal end 33 of the core 31 being exposed from the over-cladding layer 36 due to non-uniformity of the optical waveguide 34 at the time of production. In the case where the distal end 33 of the core 31 is exposed from the over-cladding layer 36, diffusive decay of outgoing light 37 of the core 31 will be remarkable. As a result, there are fears that optical transmittance from the core 31 to the photo diode 32 may become impossible. It is needed to improve the formation accuracy of the over-cladding layer 36 to prevent the distal end 33 of the core 31 from being exposed from the over-cladding layer 36. This causes a reduction in mass production capability of the optical waveguide 34.

Further, the conventional optical waveguide device 30 has a problem with optical axis alignment (core adjustments). FIG. 5 (a) shows a state in which each optical axis of respective cores 31 and respective photo diodes 32 has perfectly been aligned (the state in which core adjustments have been perfectly made). It is, however, difficult to perfectly make core adjustments to the cores 31 and the photo diodes 32, practically, as shown in FIG. 6 (a), there is a case where the center of the cores 31 and the center of the photo diodes 32 are misaligned. In the case of FIG. 6(a), an amount of deviation of the optical axes is L10.

As shown in FIG. 5 (a), when the center of the respective cores 31 and the center of the respective photo diodes 32 are not misaligned, the outgoing light of the core of No. 2 is not incident on the photo diode of No. 3. In the case of FIG. 6 (a), however, a portion of the outgoing light of the core of No. 2 is incident on the photo diode of No. 3 because the center of the core 31 and the center of the photo diode 32 are misaligned. Accordingly, there is weak incident light on the photo diode of No. 3. As a result, there is a possibility of being determined by mistake that there is outgoing light of the core of No. 3. This problem is not resolved, even when each distance L9 between the distal end 33 of the core 31 and the light-receiving surface of the photo diode 32 is shortened. To prevent the outgoing light 37 from being incident by mistake, the core adjustments in the core 31 and the photo diode 32 should be improved. This reduces mass production capability of the optical waveguide device 30.

In the conventional optical waveguide device 30, generally, the light-receiving area of the photo diodes 32 is greater than the emitting area of the cores 31 of the optical waveguide 34 (For instance, U.S. Pat. No. 6,351,260 B1, column 11, lines 56 to 62) so as to easily make optical axis adjustments (core adjustments). As the light-receiving area of the photo diode 32 is greater, respective pitches L7 between the adjacent photo diodes 32 become greater. In the conventional optical waveguide device 30, respective pitches L6 between adjacent cores 31 are identical to the respective pitches L7 between the adjacent photo diodes 32 and therefore, the respective pitches L6 between the adjacent cores 31 become greater. The problem of the mistaken determination caused by the amount L10 of deviation of optical axes between the cores 31 and the photo diodes 32 becomes easy to be solved by enlarging the respective pitches L6 between the adjacent cores 31 and the respective pitches L7 between the adjacent photo diodes 32. Such enlargement of the respective pitches L6 between the adjacent cores 31 and the respective pitches L7 between the adjacent photo diodes 32 makes it, however, difficult to improve the accuracy of the optical touch panel.

SUMMARY OF THE INVENTION

In a first example of a conventional optical waveguide device 20, the respective pitches L6 between the adjacent cores 23 are identical to the respective pitches L7 between the adjacent photo diodes 26. Accordingly, the cores 23 correspond to the photo diodes 26 one-on-one. At this time, since the distances L8 between the distal ends 24 of the cores 23 and the light-receiving surfaces of the photo diodes 26 are long, there is a case that outgoing light 25 emitted from the cores 23 is incident on the adjacent photo diodes 26. In that case, there is a possibility of being mistakenly determined that there may be outgoing light 25 on the cores 23 without outgoing light 25.

As a countermeasure for the aforementioned problem, the distances L9 between the distal ends 33 and the light-receiving surfaces of the photo diodes 32 are shortened in a second example of the conventional optical waveguide device 30. This makes it possible to prevent the reduction of the light-receiving sensitivity of the optical waveguide device 30 and mistaken determination of the touch input.

However, in the case where the distances L9 between the distal ends 33 of the cores 31 and the light-receiving surfaces of the photo diodes 32 are shortened, there are fears that the distal ends 33 of the cores 31 may be exposed from the over-cladding layer 36. When the distal ends 33 of the cores 31 are exposed from the over-cladding layer 36, the diffusive decay of the outgoing light 37 becomes more marked and thereby there are fears that optical transmission from the cores 31 to the photo diodes 32 may be impossible.

Further, in a second example of the conventional optical waveguide device 30, there is a problem with optical axis adjustments (core adjustments). In fact, it is difficult to perfectly make core adjustments to the cores 31 and the photo diodes 32 and there is a case where the center of the cores 31 and the center of the photo diodes 32 are misaligned. When the center of the cores 31 and the center of the photo diodes 32 are misaligned, the outgoing light 37 of the adjacent cores 31 is incident on the photo diodes 32. In this case, there are also fears that the cores 31 practically without outgoing light 37 may be mistakenly deemed as having outgoing light 37.

The Enlargement of the respective pitches L6 between the adjacent cores 31 and the respective pitches L7 between the adjacent photo diodes 32 makes it easier to resolve the problem of such a mistaken determination caused by the misalignment of the center of the cores 31 and the center of the photo diodes 32. However, the enlargement of the respective pitches L6 between the adjacent cores 31 and the respective pitches L7 between the adjacent photo diodes 32 is not preferable typically because this deteriorates high precision of an optical touch panel.

The summary of the present invention is as below.

In a first preferred aspect, an optical waveguide device according to the present invention comprises: an optical waveguide including a plurality of cores configured to emit outgoing light from distal ends thereof; and a light-receiving element including a plurality of photo diodes configured to receive the outgoing light. The plurality of cores and the plurality of photo diodes are aligned at predetermined pitches respectively. Respective pitches between the adjacent cores are greater in size than respective pitches between the adjacent photo diodes. At least one photo diode on which only outgoing light of each core is incident with respect to each of the cores.

In a second preferred aspect, the device according to the present invention has a ratio of 0.1 to 0.8 between the respective pitches between the adjacent photo diodes and respective pitches between the adjacent cores.

In a third preferred aspect, the device according to the present invention has a distance of 200 µm to 1,000 µm between each distal end of each of the cores and each light-receiving surface of each of the photo diodes.

In a fourth preferred aspect of the device according to the present invention, the respective pitches between the adjacent photo diodes are 2 µm to 30 µm.

In a fifth preferred aspect of the device according to the present invention, the respective pitches between the adjacent cores are 10 µm to 200 µm.

In a sixth preferred aspect of the device according to the present invention, each distal end of each of the cores is extended in a tapered shape and is substantially a semi-circle.

In a seventh preferred aspect of the device according to the present invention, a tapered portion of each of the cores has a length of 100 µm to 1,000 µm and a taper angle of 0.3 degree to 5 degrees.

In an eighth preferred aspect of the device according to the present invention, a semi-circled portion of each distal end of each of the cores has a radius of curvature of 2 µm to 50 µm.

Advantages of the Invention

There are photo diodes on which outgoing light for only one core is incident in an optical waveguide device of the present invention. It is possible to make a correct judgment whether outgoing light of corresponding cores is present or absent according to the presence or absence of incident light on the photo diodes.

In the optical waveguide device of the present invention, it is possible to make the distances between the distal ends of the cores and the light-receiving surfaces of the photo diodes longer than conventional optical waveguide devices. This eliminates the possibility of the exposure of the distal ends of the cores from the over-cladding layer. Accordingly, it becomes unnecessary to extremely increase formation accuracy of the over-cladding layer, resulting in improvement in mass production capability of optical waveguides.

In the optical waveguide device of the present invention, there are photo diodes configured to accurately determine whether or not outgoing light of the cores is present, even when the optical axis adjustments (core adjustments) of the cores and the photo diodes are not perfectly made and the center of the cores and the center of the photo diodes are not completely aligned. Consequently, the accuracy of the core adjustments may be lower than the conventional optical waveguide devices, resulting in improvement in mass production capability of the optical waveguide device.

In the optical waveguide device of the present invention, the distal ends of the cores are in the shape of a lens so as to control the spreading of outgoing light. Accordingly, the optical waveguide device of the present invention has optical transmission efficiency from the cores to the photo diodes higher than an optical waveguide device without a lens at the distal ends of cores, resulting in a higher light-receiving sensitivity than the optical waveguide device without a lens at the distal ends of cores.

BRIEF DESCRIPTION OF THE DRAWINGS

FIG. 1 (b) is a cross-sectional view of the optical waveguide device of the present invention;

FIG. 2 (b) is a cross-sectional view of the optical waveguide device of the present invention;

FIG. 3 (b) is a cross-sectional view of the optical waveguide device of the present invention;

FIG. 4 (b) is a cross-sectional view of the first example of the conventional optical waveguide device;

FIG. 5 (b) is a cross-sectional view of the second example of the conventional optical waveguide device;

FIG. 5 (c) is a cross-sectional view of the second example of the conventional optical waveguide device;

FIG. 6 (b) is a cross-sectional view of the second example of the conventional optical waveguide device.

DESCRIPTION OF THE PREFERRED EMBODIMENTS

Figure 1:
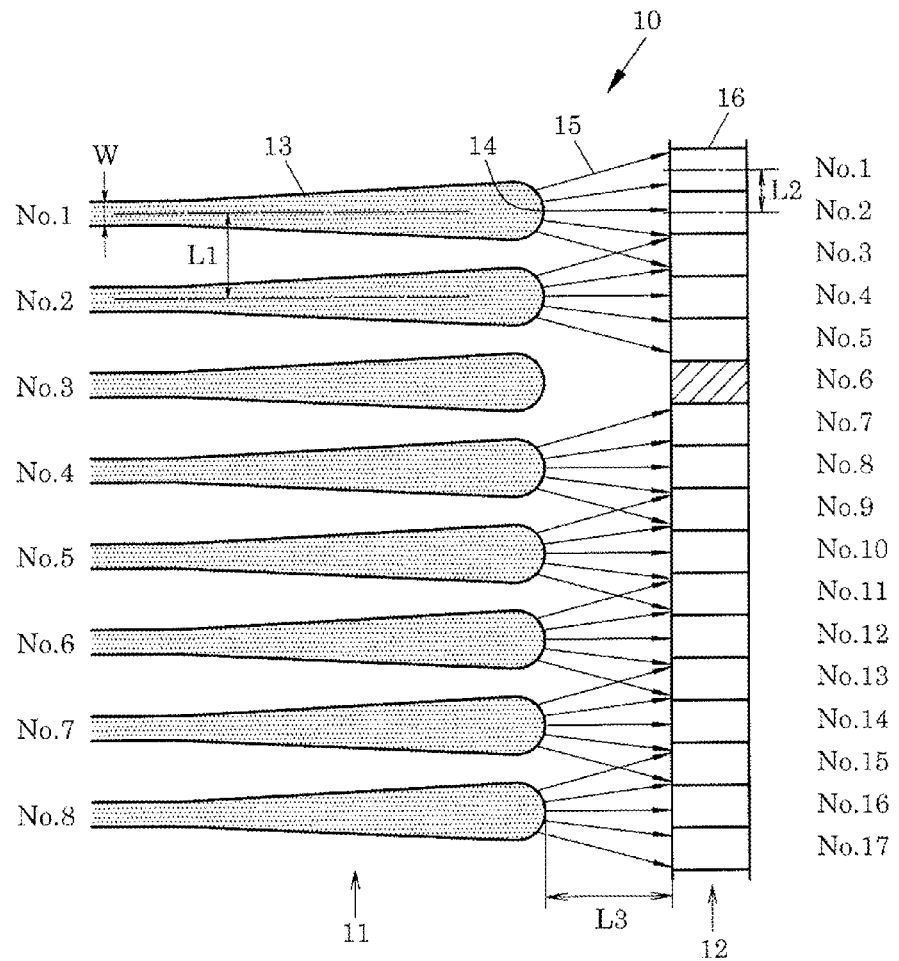
FIG. 1 (a) is a plan view of an optical waveguide device of the present invention.
Figure 1:
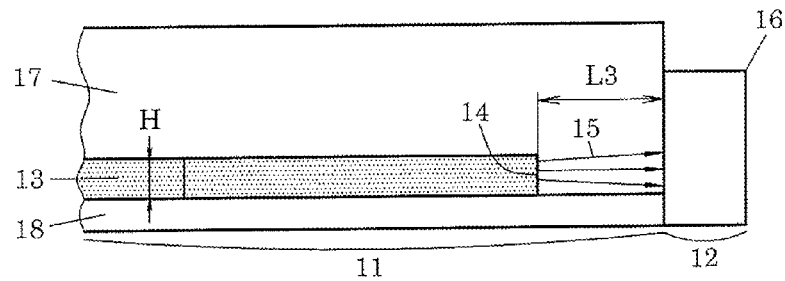

The preferred embodiments of the present invention will now be described with reference to FIGS. 1-6 of the drawings. Identical elements in the various figures are designated with the same reference numerals.

[Optical Waveguide Device]

As shown in FIG. 1 (a) which is a plan view and FIG. 1 (b) which is a cross-sectional view, an optical waveguide device 10 of the present invention comprises: an optical waveguide 11 and a light-receiving element 12. The optical waveguide 11 includes a plurality of cores 13 aligned at predetermined pitches. Each core 13 emits light 15 from each distal end 14. The light-receiving element 12 includes a plurality of photo diodes 16 aligned at predetermined pitches. Each photo diode 16 receives light 15 emitted from each core 13.

In the optical waveguide device 10 of the present invention, respective pitches (central clearance) L1 between adjacent cores 13 are greater than respective pitches (central clearance) L2 between adjacent photo diodes 16. In other words, the relationship between the respective pitches L1 between the adjacent cores 13 and the respective pitches L2 between the photo diodes 16 is L1>L2. The ratio L2/L1 between the respective pitches L2 between the adjacent photo diodes 16 and the respective pitches L1 between the adjacent cores 13 is preferably 0.1 to 0.8, more preferably, 0.15 to 0.5. Accordingly, at least two photo diodes 16 are faced to one core 13. That is, the cores 13 do not correspond to the photo diodes 16 one-on-one.

As shown in FIG. 1 (a), in the optical waveguide device 10 of the present invention, outgoing light 15 emitted from the distal end 14 of the core 13 travels while spreading out in a fan-like shape. The spreading (angular distribution) of outgoing light 15 is not particularly different from the spreading (angular distribution) of outgoing light 37 of a core 31 of a conventional optical waveguide device 30 (second example). However, respective distances L3 between the distal ends 14 of the cores 13 and light-receiving surfaces of the photo diodes 16 are longer than respective distances L9 between distal ends 33 of cores 31 and light-receiving surfaces of the photo diodes 32. Accordingly, a range where outgoing light 15 spreads on the light-receiving surfaces of the photo diodes 16 is greater than that of the conventional optical waveguide device 30 (second example).

Further, the respective pitches L2 between the adjacent photo diodes 16 are smaller than the respective pitches L1 between the adjacent cores 13 and thereby outgoing light 15 of one core 13 tends to be incident on a plurality of photo diodes 16. In many cases, outgoing light 15 of the plurality of cores 13 is incident on one photo diode 16 when seeing from the photo diode 16-side. However, outgoing light 15 of the plurality of cores 13 is not necessarily incident on all of the photo diodes 16 but there are some photo diodes 16 on which only outgoing light 15 of one core 13 is incident. Such a core 13 is herein referred to as a core 13 corresponding to the photo diode 16. Outgoing light 15 of the other core 13 is not incident on the photo diode 16. Accordingly, when there is no outgoing light 15 of the corresponding core 13, there is no incident light on the photo diode 16.

Referring now in particular to FIG. 1 (a), typically, outgoing light 15 in the core 13 of No. 4 is incident on the photo diodes 16 of No. 7 to No. 9. Outgoing light 15 of the core 13 of No. 5 is incident on the photo diodes 16 of No. 9 to No. 11. Outgoing light 15 in the core 13 of No. 6 is incident on the photo diodes 16 of No. 11 to No. 13. Consequently, outgoing light 15 in the cores 13 of No. 4 and outgoing light 15 in the core 13 of No. 5 are incident on the photo diode 16 of No. 9. Further, outgoing light 15 in the core 13 of No. 5 and outgoing light 15 in the core 13 of No. 6 are incident on the photo diode 16 of No. 11.

However, only outgoing light 15 in the core 13 of No. 5 is incident on the photo diode 16 of No. 10. In other words, outgoing light 15 of the core 13 other than the core 13 of No. 5 is not incident on the photo diode 16 of No. 10.

Similarly, only outgoing light 15 in the core 13 of No. 3 is incident on the photo diode 16 of No. 6. As shown in FIG. 1 (a), there is, therefore, no incident light in the photo diode 16 of No. 6 when there is no outgoing light in the core 13 of No. 3. As a result, it is possible to correctly determine the presence or absence of outgoing light 15 in the core 13 of No. 3 depending on the presence or absence of incident light of the photo diode 16 of No. 6.

In the optical waveguide device 10 of the present invention, the respective pitches L2 between the adjacent photo diodes 16 are set to be smaller than the respective pitches L1 between the adjacent cores 13. This makes it possible to set the respective distances L3 between the distal ends 14 of the cores 13 and the light-receiving surfaces of the photo diodes 16 longer than the respective distances L9 between the distal ends 33 of the cores 31 and the light-receiving surfaces of the photo diodes 32 in the conventional optical waveguide device 30 (Second Example). More specifically, the respective distances L3 between the distal ends 14 of the cores 13 and the light-receiving surfaces of the photo diodes 16 are preferably 200 μm to 1,000 μm.

In the case where the respective distances L3 between the distal ends 14 of the cores 13 and the light-receiving surfaces of the photo diodes 16 are smaller than 200 μm, there is a possibility that the distal ends 14 of the cores 13 may be exposed from the over-cladding layers 17 due to non-uniformity of production. Accordingly, the respective distances L3 between the distal ends 14 of the cores 13 and the light-receiving surfaces of the photo diodes 16 are preferably 200 μm or greater.

In the case where the respective distances L3 between the distal ends 14 of the cores 13 and the light-receiving surfaces of the photo diodes 16 are greater than 1,000 μm, there is a possibility that such photo diodes 16 on which only outgoing light 15 of one core 13 is incident may no longer exist. In other words, there is a possibility that outgoing light 15 of a plurality of cores 13 may be incident on any of the photo diodes 16. In that case, the photo diodes 16 that can be determined for sure the presence or absence of outgoing light 15 of the cores 13 no longer exist. Therefore, the distances L3 between the distal ends 14 of the cores 13 and the light-receiving surfaces of the photo diodes 16 are preferably 1,000 μm or smaller.

Figure 2:
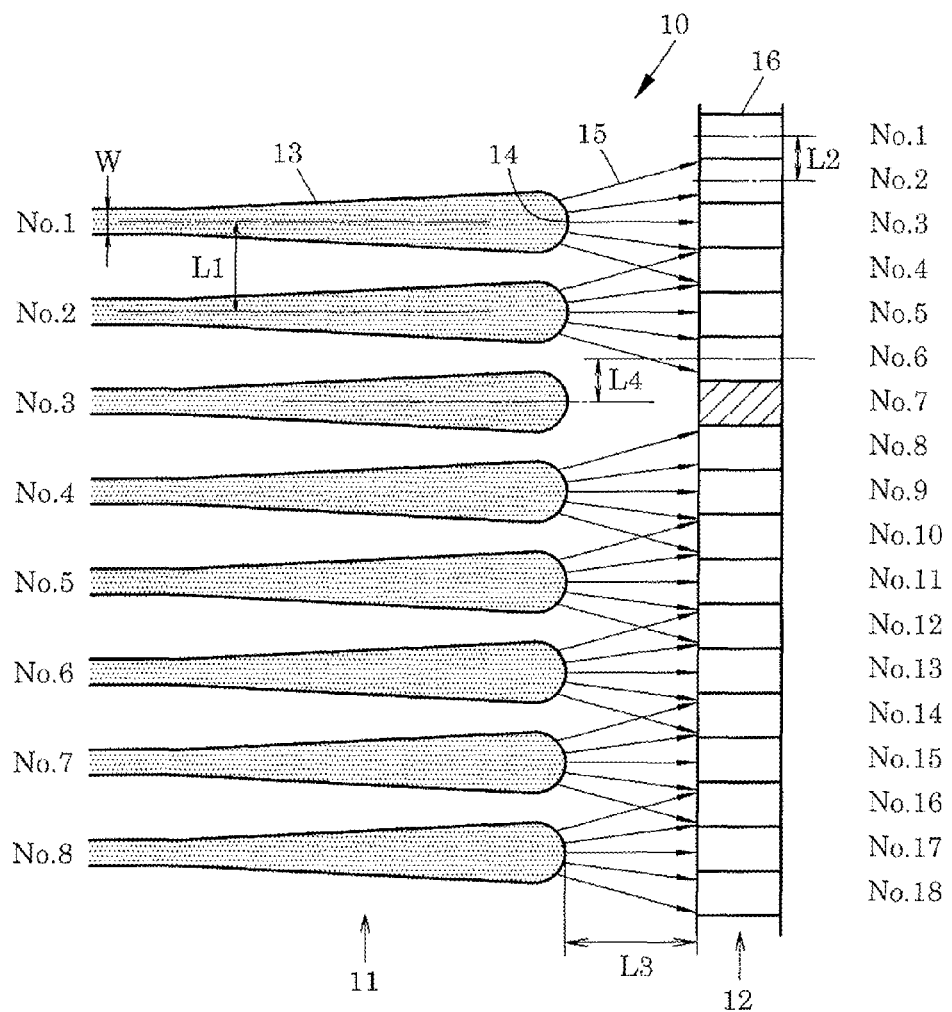
FIG. 2 (a) is a plan view of an optical waveguide device of the present invention.
Figure 2:
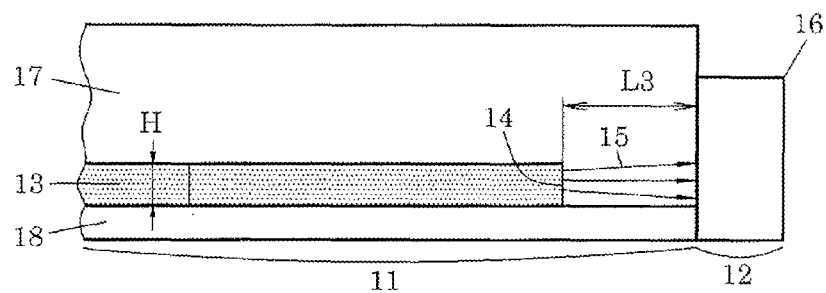

FIG. 1 (a) illustrates a status in which the center of the respective cores 13 and the center of the respective photo diodes 16 are perfectly aligned (core adjustments are completely made) in an optical waveguide device of the present invention. However, as shown in FIG. 1 (a), it is difficult to perfectly align the center of the respective cores 13 and the center of the respective photo diodes 16 even in the optical waveguide device 10 of the present invention. In fact, as shown in FIG. 2 (a) (a plan view), there is a case where the center of the respective cores 13 and the center of the respective photo diodes 16 are misaligned. The amount of deviation of optical axes in the case of FIG. 2 (a) is indicated as L4.

In the case of FIG. 1 (a), the center of the respective cores 13 and the center of the respective photo diodes 16 are not misaligned, so that only outgoing light 15 in the core 13 of No. 3 is incident on the photo diode 16 of No. 6. On the other hand, in the case of FIG. 2 (a), since the center of the respective cores 13 and the center of the respective photo diodes 16 are misaligned, only outgoing light 15 in the core 13 of No. 3 is incident on the photo diode 16 of No. 7. Accordingly, the positional relationship between the photo diodes 16 and the cores 13 is different between FIG. 1(a) and FIG. 2(a).

However, it is possible to modify the misalignment of such positional relationship between the photo diodes 16 and the cores 13 using software, for example, when an optical touch panel is initialized (proofread) at the time of starting the use of the optical touch panel. Thus, there will be substantially no problem, even if the positional relationship between the photo diodes 16 and the cores 13 is misaligned. What is important is that there is a photo diode 16 capable of accurately determining as to the presence or absence of the outgoing light with respect to any core 13 in the optical waveguide device of the present invention. That is referred to as the photo diode 16 corresponding to the core 13. For instance, in FIG. 1 (a), it is possible to make an accurate determination whether outgoing light 15 in the core 13 of No. 3 is present or absent according to the presence or absence of incident light in the photo diode 16 of No. 6. In FIG. 2 (a), it is possible to accurately determine whether outgoing light 15 in the core 13 of No. 3 is present or absent according to the presence or absence of incident light of the photo diode 16 of No. 7.

[Light-Receiving Element]

The light-receiving element 12 to be used for the optical waveguide device 10 of the present invention has a plurality of photo diodes 16 aligned at predetermined pitches. This kind of light-receiving element 12 is generally referred to as a linear image sensor. Such a light-receiving element 12 is used to detect light intensity received at the optical waveguide 11 so as to convert an optical signal into an electrical signal. Preferable examples of a light-receiving element 12 include a Complementary Metal-oxide Semiconductor (CMOS) linear image sensor and a Charge Coupled Device (CCD) linear image sensor.

The light-receiving element 12 to be used in the present invention preferably has 500 or more photo diodes 16, more preferably 1,000 or more photo diodes 16. The pitches L2 between the adjacent photo diodes 16 are preferably 2 μm to 30 μm, more preferably 5 μm to 10 μm. In the case where the pitches L2 between the adjacent photo diodes 16 are small (approximately 2 μm to 5 μm), it is possible to improve the fineness degree of an optical touch panel by typically making the pitches L1 between the adjacent cores 13 smaller. In the case where the pitches L2 between the adjacent photo diodes 16 are large (approximately 10 μm to 30 μm), the respective light-receiving surfaces of the photo diodes 16 are wider, resulting in increased sensitivity of the light-receiving element 12. This typically makes it possible to increase the sensitivity of the optical touch panel.

[Optical Waveguide]

The optical waveguide 11 to be used in the present invention has a plurality of cores 13 configured to lead light to the photo diodes 16. The plurality of cores 13 are aligned at predetermined pitches. The cores 13 are generally embedded in cladding layers 17 and 18. A combination of an under-cladding layer 18 and an over-cladding layer 17 is herein referred to as cladding layers 17 and 18. It is possible to typically obtain such an optical waveguide 11 by a method for manufacturing a polymer optical waveguide described on pages 76 to 81 in "All about Optical Wiring Technologies" written by Takeshi Shioda by Kogyo Chosakai Publishing Co., Ltd.

The cores 13 are formed of any material having a high transparency at the wavelength of light traveling through the cores 13 and a higher refractive index than the cladding layers 17 and 18. A material for forming the cores 13 is preferably an ultraviolet curable resin having excellent patterning properties.

The pitches L1 between the adjacent cores 13 of the optical waveguide 11 are preferably 10 μm to 200 μm, more preferably 20 μm to 100 μm in the range where the relationship between the pitches L1 between the adjacent cores 13 and the pitches L2 between the adjacent photo diodes 16 satisfies L1>L2. The width W of the cores 13 is typically 4 μm to 100 μm and the height H of the cores 13 is typically 10 μm to 100 μm.

The cladding layers 17 and 18 are formed of any material having a lower refractive index than the cores 13. The maximum refractive index difference between the cores 13 and the cladding layers 17 and 18 is preferably 0.01 or greater, more preferably 0.02 to 0.2. A material for forming the cladding layers 17 and 18 is preferably a thermosetting resin or an ultraviolet curable resin.

The number of cores 13 of the optical waveguide 11 is appropriately designed in accordance with a purpose thereof, however, is typically 50 to 2,000.

Figure 3:
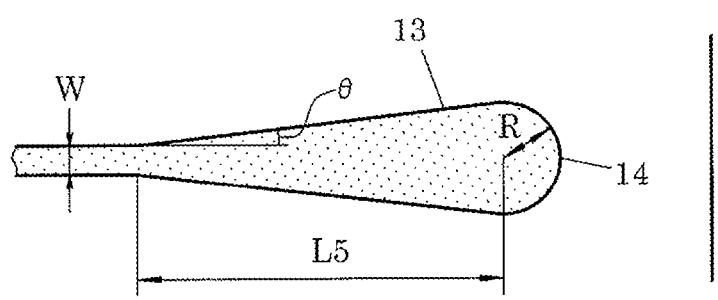
FIG. 3 (a) is a plan view of an optical waveguide device of the present invention.
Figure 3:
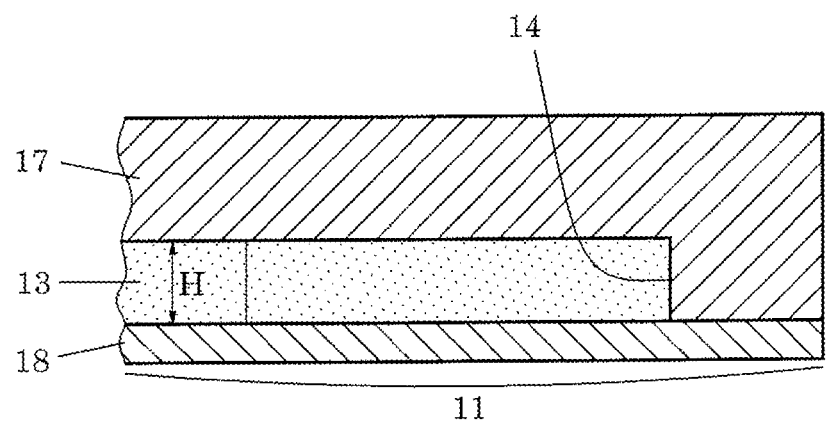
Figure 4:
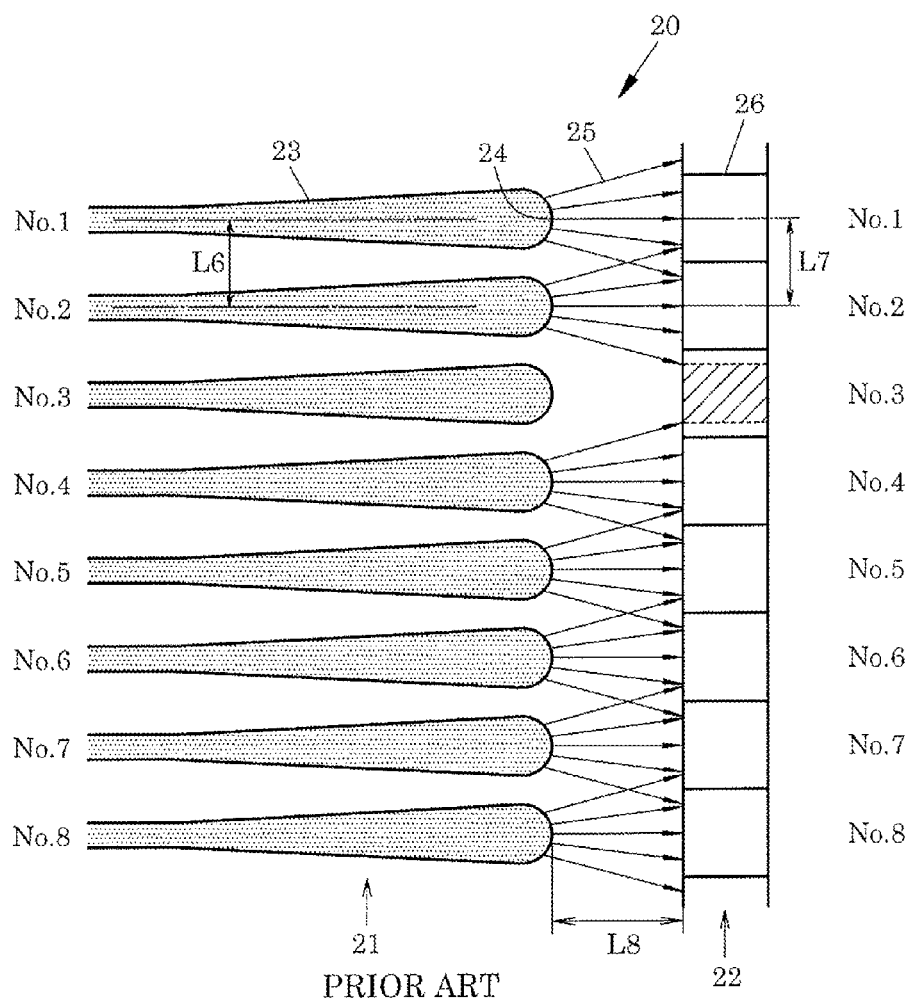
FIG. 4 (a) is a plan view of a first example of a conventional optical waveguide device.
Figure 4:
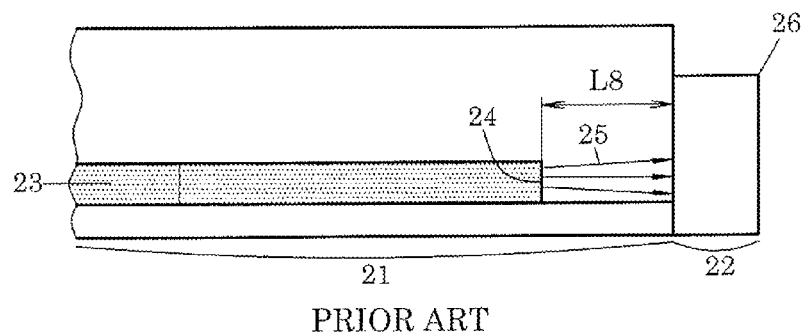
Figure 5:
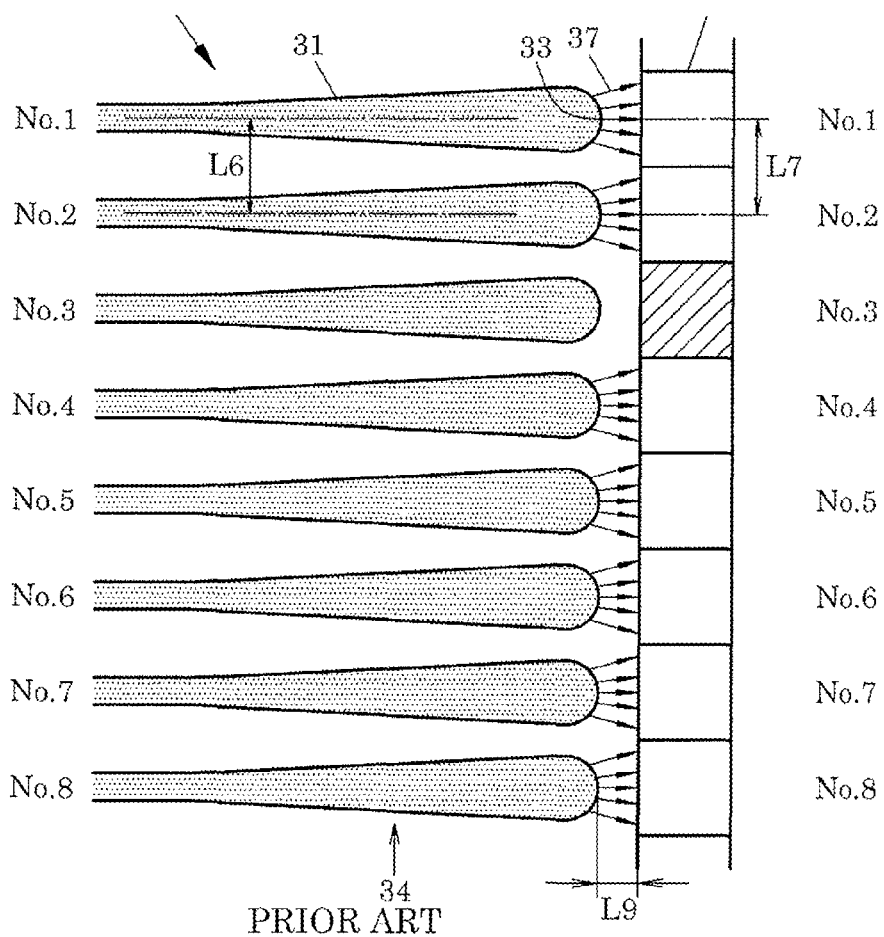
FIG. 5 (a) is a plan view of a second example of a conventional optical waveguide device.
Figure 5:
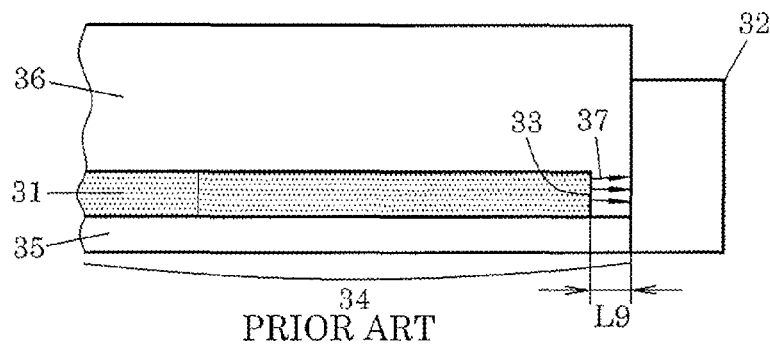
Figure 5:
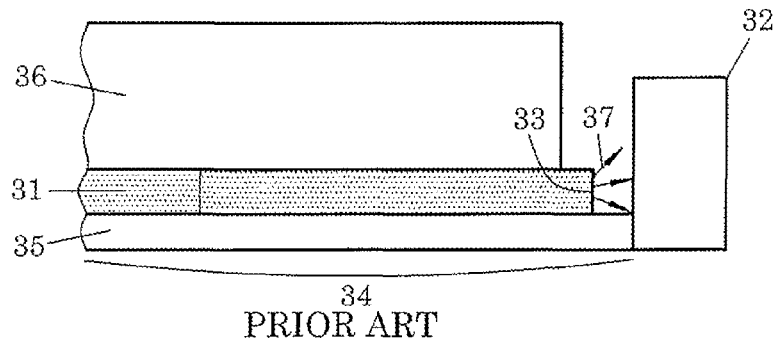
Figure 6:
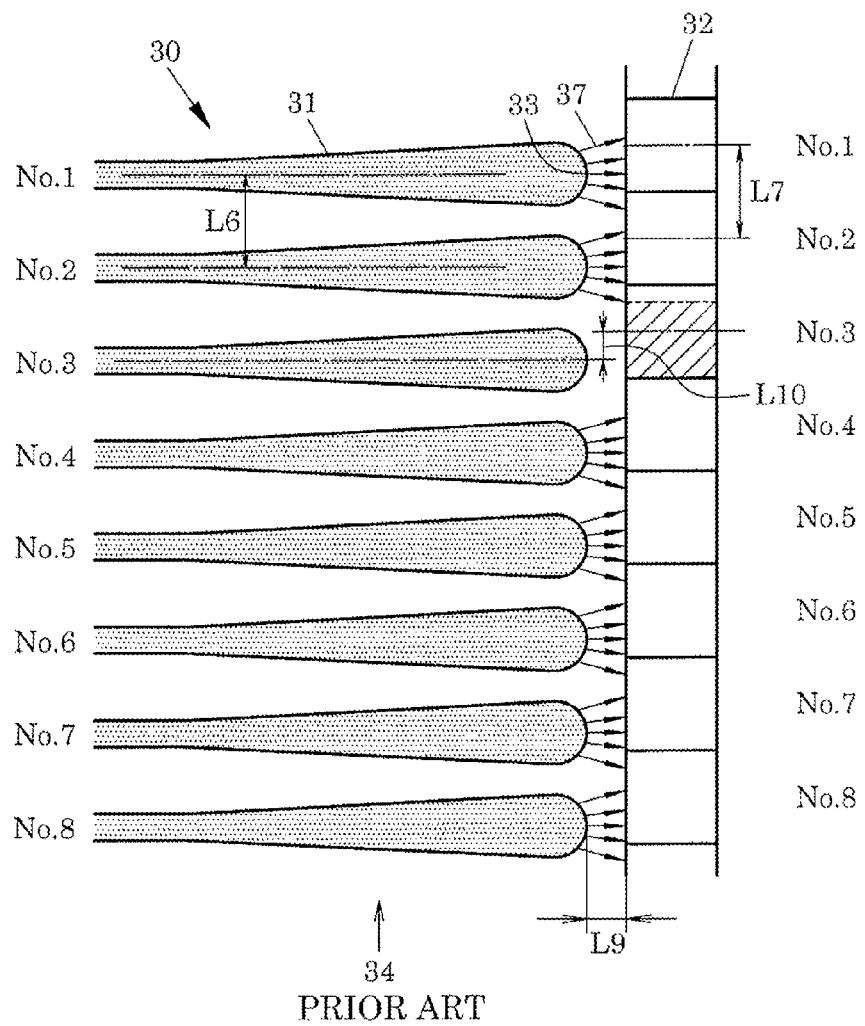
FIG. 6 (a) is a plan view of the second example of the conventional optical waveguide device.
Figure 6:
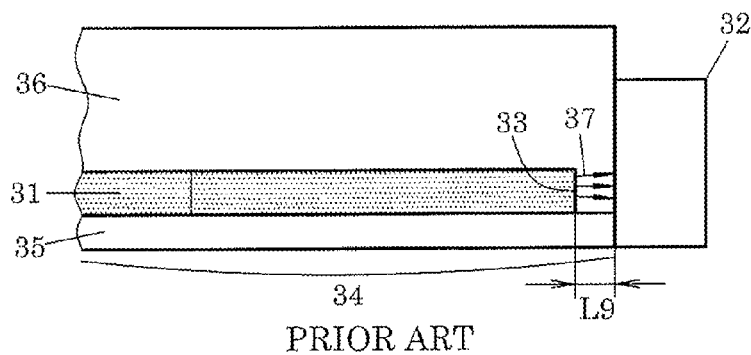

Respective distal ends 14 of the cores 13 to be used in the present invention are preferably in the shape of a lens to inhibit spreading of outgoing light 15. Respective distal end parts of the cores 13 preferably have a structure shown in FIGS. 3 (a) (a plan view) and 3 (b) (a cross-sectional view). As shown in FIG. 3 (a), the distal end 14 of the core 13 is extended in a tapered shape, for example, toward the light-receiving element 12. Typically, the distal end 14 of the core 13 is vertically a semi-circle. A length L5 which represents a portion extended in a tapered shape is herein referred to as a length L5 of a lens. The tapered portion preferably has an angle θ of 0.3° to 5°. The length L5 of the lens is preferably 100 μm to 1,000 μm. The semicircular portion of the distal end 14 preferably has a radius of curvature R of 2 μm to 50 μm.

The optical waveguide device 10 of the present invention is in the shape of a lens such that the distal ends 14 of the cores 13 inhibit the spreading of outgoing light 15. Consequently, the optical waveguide device 10 of the present invention has a transmission efficiency of light from the cores 13 to the photo diodes 16 higher than optical waveguide devices without any lens at the distal ends of the cores, resulting in high light-receiving sensitivity.

EXAMPLE

[Preparation of Varnish for Forming a Cladding Layer]

A varnish for forming a cladding layer was prepared by mixing 100 parts by weight of a UV-curable epoxy-based resin having an alicyclic skeleton (EP 4080E manufactured by ADEKA CORPORATION) (Component A) and 2 parts by weight of a photo-acid-generation agent (CPI-200K manufactured by SAN-APRO Ltd.) (Component B).

[Preparation of Varnish for Forming Cores]

A varnish for forming cores was prepared by mixing 40 parts by weight of a UV-curable epoxy-based resin having a fluorene skeleton (OGSOL EG manufactured by Osaka Gas Chemicals Co., Ltd.) (Component C), 30 parts by weight of a UV-curable epoxy-based resin having a fluorene skeleton (EX-1040 manufactured by Nagase ChemteX Corporation) (Component D), 30 parts by weight of 1,3,3-tris(4-(2-(3-oxetanyl))butoxyphenyl)butane (synthesized in accordance with Example 2 in JP 2007-070320 A) (Component E), 1 part by weight of a photo-acid-generating agent (Component B)(manufactured by San-Apro Ltd.; Product name: CPI-200K), and 41 parts by weight of ethyl lactate.

[Formation of Optical Waveguide]

The varnish for forming the aforementioned cladding layer was applied onto a surface of a polyethylene naphthalate (PEN) film having a thickness of 188 μm, irradiated with UV light at 1,000 mJ/cm$^2$, and was thermally-treated at 80° C. for 5 minutes to form an under-cladding layer 18 having a thickness of 20 μm. The refractive index of the under-cladding layer 18 as measured at a wavelength of 830 nm was 1.510.

Then, the varnish for forming cores was applied onto the surface of the under-cladding layer 18 and drying treated at 100° C. for 5 minutes to form a core layer. The core layer was then covered with a photo mask (gap: 100 μm), irradiated with UV light at 2,500 mJ/cm$^2$, and thermally-treated at 100° C. for 10 minutes.

An unexposed portion of the core layer was dissolved away using an aqueous γ-butyrolactone solution and thermally treating the core layer at 120° C. for 5 minutes to form a plurality of cores 13. The cores respectively have a width of 30 μm, a height of 50 μm, and a pitch L1 of 52 μm. The refractive index of each of the cores at a wavelength of 830 nm was 1.592. And the lens has a length L5 of 200 μm and a taper angle θ of 3.5°. The distal ends 14 of the cores 13 are respectively an aspheric lens having a radius of curvature of 20 μm and the Conic constant of −1.

The varnish for forming a cladding-layer was applied onto the surface of the under-cladding layer 18 so as to embed the cores 13. The core layer was then irradiated with UV light at 2,000 mJ/cm$^2$, and was thermally-treated at 80° C. for 5 minutes. As a result, an over-cladding layer 17 having a thickness of 1 mm was formed. The refractive index of the over-cladding layer 17 as measured at a wavelength of 830 nm was 1.510. As mentioned above, the optical waveguide 11 was formed.

[Formation of Optical Waveguide Device]

A light-receiving element 12 (CMOS linear sensor array s10226 produced by Hamamatsu Photonics Co., Ltd., pitch L2=7.8 μm) where 1,024 photo diodes 16 were aligned was prepared. The optical waveguide 11 and the light-receiving element 12 were coupled to each other via a varnish for forming a cladding layer so that the distal ends 14 of the cores 13 might be oppositely faced to the photo diodes 16 to form an optical waveguide device 10.

In the optical waveguide device 10, the respective distances L3 from the distal ends 14 of the cores 13 in the optical waveguide 11 to the light-receiving surfaces of the photo diodes 16 were 300 μm.

With the use of the optical waveguide device 10, an optical touch panel having a coordinate input region of 211 mm×158 mm was formed. The light-receiving sensitivity of the optical touch panel was high and no mistaken determination on touches was found.

[Measurement Methods]

[Refractive Index]

The varnish for forming a cladding layer and the varnish for forming cores were respectively applied onto silicon wafers by spin coating to form films thereon so that refractive-index measuring films were prepared, and these were measured by using a prism coupler (SPA-400 manufactured by Sairon Technology, Inc.).

[Width and Height of Core]

An optical waveguide 11 thus produced was cut crosswise using a dicing saw (DAD522 manufactured by DISCO Corporation), and the cutting surface of the optical waveguide was observed using a laser microscope (manufactured by Keyence Corporation) to measure the width W and height H of each core 13.

[Pitch of Core, Pitch of Photo Diode, and Distance Between Distal End of Core and Light-Receiving Surface of Photo Diode]

The pitch L1 between the adjacent cores 13, the pitch L2 between the adjacent photo diodes 16, and the distance L3 from the distal end 14 of the cores 13 to the light-receiving surfaces of the photo diodes 16 were obtained from a photo taken by a microscope (manufactured by Keyence Corporation).

INDUSTRIAL APPLICABILITY

The optical waveguide device 10 of the present invention is preferably used for an optical touch panel and an optical wiring plate.

What is claimed is:

1. An optical waveguide device comprising:
an optical waveguide including an under-cladding layer; a plurality of cores configured to be formed on the under-cladding layer and emit outgoing light from distal ends thereof; and an over-cladding layer configured to embed the plurality of cores; and
a light-receiving element including a plurality of photo diodes configured to receive the outgoing light,
the plurality of cores and the plurality of photo diodes are aligned at predetermined pitches respectively,
respective pitches between the adjacent cores are greater in size than respective pitches between the adjacent photo diodes, and
at least one photo diode on which only outgoing light of each core is incident is present with respect to each of the cores.

2. The optical waveguide device according to claim 1, having a ratio of 0.1 to 0.8 between the respective pitches between the adjacent photo diodes and the respective pitches between the adjacent cores.

3. The optical waveguide device according to claim 1 or claim 2, having a distance of 200 μm to 1,000 μm between each distal end of each of the cores and each light-receiving surface of each of the photo diodes.

4. The optical waveguide device according to claim 1 or claim 2, wherein the respective pitches between the adjacent photo diodes are 2 μm to 30 μm.

5. The optical waveguide device according to claim 1 or claim 2, wherein the respective pitches between the adjacent cores are 10 μm to 200 μm.

6. The optical waveguide device according to claim 1 or claim 2, wherein each distal end of each of the cores is extended in a tapered shape and is substantially a semi-circle.

7. The optical waveguide device according to claim 6, wherein a tapered portion of each of the cores has a length of 100 μm to 1,000 μm and a taper angle of 0.3 degree to 5 degrees.

8. The optical waveguide device according to claim 6, wherein a substantially semi-circled portion of each distal end of each of the cores has a radius of curvature of 2 μm to 50 μm.

* * * * *